United States Patent [19]

Miller

[11] 4,257,438

[45] Mar. 24, 1981

[54] BULK CATALYST PROPORTIONER

[76] Inventor: Donald V. Miller, N. 87 W. 15898 Bellview Blvd., Menomonee Falls, Wis. 53051

[21] Appl. No.: 961,179

[22] Filed: Nov. 16, 1978

[51] Int. Cl.³ .............................................. F16K 19/00

[52] U.S. Cl. ...................................... 137/88; 137/334; 137/606

[58] Field of Search ................. 164/12, 16; 137/7, 88, 137/334, 606

[56] References Cited

U.S. PATENT DOCUMENTS

| | | | |
|---|---|---|---|
| 3,369,558 | 2/1968 | Hughey | 137/88 |
| 3,726,300 | 4/1973 | Chevalier | 137/88 |
| 3,919,162 | 11/1975 | Austin | 164/12 X |
| 4,105,725 | 8/1978 | Ross | 164/16 X |
| 4,112,515 | 9/1978 | Sandow | 164/16 X |
| 4,132,260 | 1/1979 | Luber | 164/16 |

*Primary Examiner*—Robert G. Nilson

*Attorney, Agent, or Firm*—Wheeler, Morsell, House & Fuller

[57] ABSTRACT

Method and apparatus for mixing a carrier gas with a foundry aggregate resin catalyst fluid in which the liquid catalyst fluid is vaporized to a gaseous state and is thereafter mixed with the carrier gas. A proper proportion between the two gases is established by the setting of variable valves which control the flow of the two gases. The setting of the variable valve for the carrier gas establishes a flow rate for that gas at a given load level. The variable valve for the other gas is then set to establish a flow rate for the other gas with the desired proportion between the flow rates of said gases at said given load level. When the gas mixture is drawn upon at said given load level or at reduced load levels, the valves retain their initial relative settings and maintain the desired proportion, regardless of load level.

1 Claim, 2 Drawing Figures

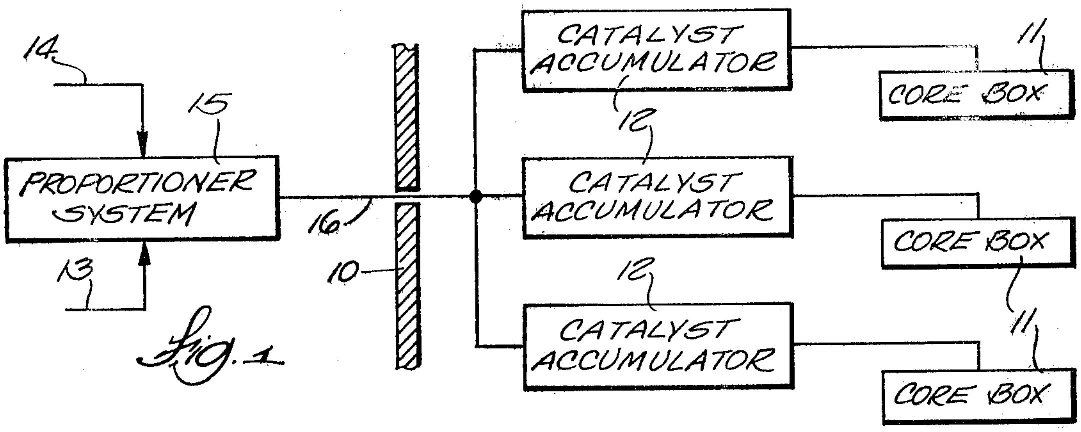
Fig. 1
Fig. 2
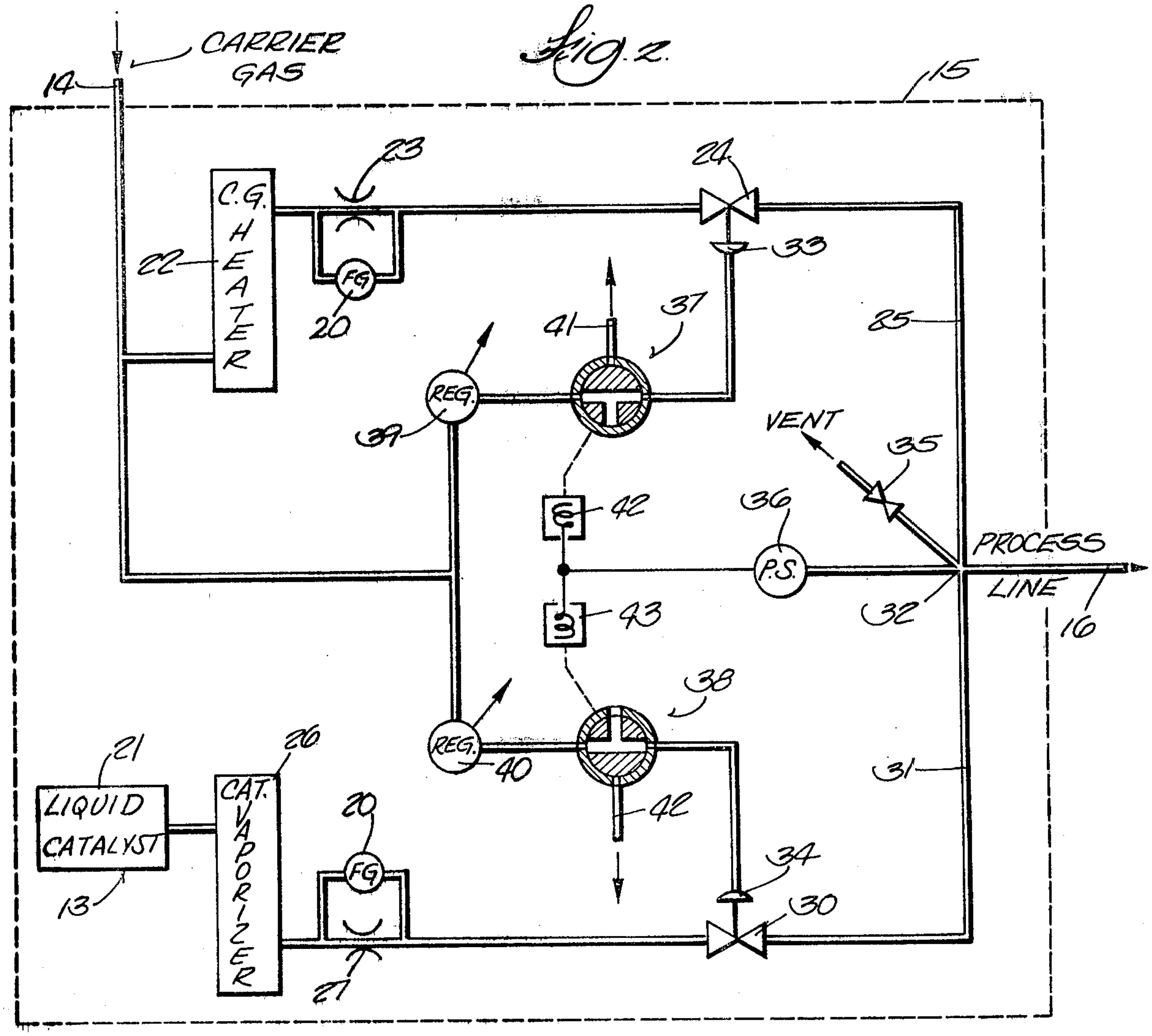

BULK CATALYST PROPORTIONER

BACKGROUND OF THE INVENTION

U.S. Pat. No. 4,112,515 discloses a technique for mixing a carrier gas and a catalyst fluid for curing foundry molds and cores in which the catalyst fluid is vaporized before it is mixed with the carrier gas. The desired proportion between the catalyst gas and the carrier gas is arrived at in this prior patent by sensing the flow of the carrier gas and adjusting a variable valve in the flow path of the catalyst gas to achieve the proper proportion therebetween. The technique of U.S. Pat. No. 4,112,515 is regarded as an improvement over the technique of U.S. Pat. No. 3,919,162 in which the catalyst is still in its liquid phase when it is mixed with the carrier gas. However, the above-described technique of U.S. Pat. No. 4,112,515 may not respond quickly or accurately enough to load conditions to consistently regulate the proper porportion of the gases in the mixture. Load changes are sometimes not sensed quickly enough by the comparator mechanism, thus producing a time lag in the proportioning apparatus. The comparator of the prior art system relies upon sensing gas flow. Such sensing can be delayed because of the intertia and momentum characteristics of the gas flow, thus delaying response of the comparator to changing load conditions.

SUMMARY OF THE INVENTION

In accordance with the present invention, the proportioning of the two gases is set initially through two variable valves, one of which is in the path of carrier gas flow and the other of which is in the path of catalyst gas flow. To calibrate the system, the valve for one gas is set by the operator at a given maximum demand load on the system, and the other valve is then set by the operator to produce the proper proportion between the gases flowing through the two valves. Thereafter, the system is operated at the given load or at reduced loads without any need for the operator to change the valve settings. However, both valves are subject to simultaneous resetting at either open or closed position, in response to changing pressure conditions in the load line, according to demand. These changes in valve settings are made simultaneously in both valves and maintain the proper proportion between gas flow in the catalyst gas line and carrier gas line, regardless of demand and without requiring any comparison or other sensing of flow rates, etc. Accordingly, the technique of the present invention is not subject to time delay in its response to changing load demands.

While the invention is described in connection with mixing a carrier gas and a catalyst gas used in cold box foundry core and mold processing, it is also adapted for other uses where several gases are to be mixed, for example, in welding, flame cutting, etc.

Other objects, features and advantages of the invention will appear from the disclosure hereof.

DESCRIPTION OF THE DRAWINGS

FIG. 1 is a schematic view illustrating a piping system in a foundry utilizing a catalyst for curing a mold or core.

FIG. 2 is a more detailed schematic drawing showing particulars of a proportioning system embodying the invention.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The technique of U.S. Pat. No. 4,112,515 of vaporizing a catalyst liquid before mixing it with a carrier gas is utilized in the practice of the present invention. Various catalysts for use in curing phenolic type resins are disclosed in U.S. Pat. No. 3,409,579. Such will be referred to herein as foundry aggregate resin catalysts. The techniques of the prior patents are utilized in the practice of the present invention, but the technique of the present invention for regulating the proportion between the carrier gas and the catalyst gas constitutes an improvement thereover.

In foundry mold and core curing using foundry aggregate resin catalysts of the type hereinbefore mentioned, a typical desired ratio between the carrier gas and the catalyst gas is approximately 8% by volume of the total mixture comprising catalyst gas and 92% of the total mixture comprising carrier gas. For other uses of the invention, for example, mixing various gases to be used in welding or flame cutting technologies, other ratios between various gases are desired and are maintained in accordance with the present invention.

FIG. 1 shows schematically a core or mold room wall 10 having one or more core or mold boxes 11 within the room and which are operated with a gas-phase catalyst used to cure the resin binder of a sand-resin mixture from which the mold or core is to be made. The gas mixture in the proper proportion between the carrier gas and catalyst gas may be stored in the core or mold room in tanks 12.

The apparatus for mixing and proportioning the carrier gas and the catalyst is located in a separate room at the opposite side of wall 10, for safety and environmental reasons. A catalyst liquid from source 13 and a carrier gas from source 14 are supplied to the proportioning system 15. The proportioning system 15 feeds a process line 16 which feeds through the wall 10 to the gas accumulator tanks 12.

The proportioning system 15 is shown in more detail, but still schematically, in FIG. 2. The carrier gas input 14 leads to a carrier gas heater 22. The liquid catalyst input 13 leads to a liquid catalyst tank 21. Carrier gas input 14 leads through a heater 22, a flow orifice 23, a variable carrier gas flow control valve 24 and carrier gas line 25 to its juncture at 32 with the process line 16 which carries a mixture of the catalyst gas and the carrier gas.

The liquid catalyst in tank 21 is fed to a vaporizer 26 which typically comprises a heater which vaporizes the catalyst liquid into its gaseous state, whereupon it is fed through a flow orifice 27, a variable catalyst flow control valve 30, and a catalyst gas line 31 to its juncture 32 with the process line 16. The intermixture of the carrier gas and the catalyst gas occurs in the process line 16, after the respective gases arrive at their proper flow rates for the proper proportioning therebetween.

Each variable valve 24, 30 is provided with an adjusting or controller mechanism 33, 34 which can take any suitable form. The control mechanism 33, 34 can be manually operated or remotely operated, as desired, and through any suitable available technique. In the illustrated embodiment, controllers 33, 34 are fluid actuated by the carrier gas 14 which infeeds to conventional manually adjusted pressure regulators 39, 40. The output of regulators 39, 40 leads through three-way valves 37, 38 to the fluid actuated controllers 33, 34. Each three-way valve 37, 38 has a relief vent 41, 42 and is switched between its several positions by solenoid actuators 42, 43 by pressure switch 36 which senses pressure in process line 16. When pressure in line 16 drops to indicate a demand for gas, pressure switch 36 energizes solenoids 42, 43 simultaneously to position three-way valves 37, 38 as illustrated in the drawing and hence connect controllers 33, 34 to manually adjusted pressure regulators 39, 40 and thus open variable valves 24, 30 to their settings established by the regulators 39, 40. When pressure in process line 16 rises to indicate lack of demand for gas, pressure switch 36 energizes solenoids 42, 43 simultaneously to position three-way valves 37, 38 to their positions in which gas flow from regulators 39, 40 to controllers 33, 34 is cut off and gas pressure in controllers 33, 34 is relieved through vents 41, 42, whereupon variable valves 24, 30 will close.

The technique for initially calibrating the system to provide the proper mass ratio between the carrier gas and the catalyst gas is to open the process line 16 through a bypass valve 35 so as to produce a flow through the proportioning system 15 which is equivalent to that required for the predetermined maximum load to which the system will be subject. For example, in one system this may be determined to be ten tons of sand cured per hour in a core box or boxes 11. With three-way valve 37 in its position shown in FIG. 2 and by manually adjusting pressure regulator 39, adjustment of the control 33 for variable valve 24 at this predetermined load will establish a flow rate of carrier gas through the flow orifice 23 and through the control valve 24 into the process line 16 to provide a sufficient flow in the carrier gas line to supply this demand. Merely by way of example, the flow of carrier gas for ten tons of sand per hour demand might be approximately 1282 cubic feet of carrier gas per hour. In this example, this flow rate of carrier gas is 92% by volume of the total flow of the gas mixture in the process line 16. Flow rates are read on flow gauges or meters 20 respectively about orifices 23, 27.

When the desired flow rate has been established in the variable valve 24, the operator will then adjust the controller 34 for the other variable valve 30 for the catalyst gas, using regulator 40 with three-way valve 38 in the FIG. 2 position at a flow which will be the desired percentage of the volume of total flow in the process line 16. In the typical case previously mentioned, this will be 8% by volume of total flow, or 106 cubic feet of catalyst gas per hour.

With the adjustments aforestated, both valves 24, 30 have been initially set and calibrated to provide the proper mass ratio or proportion of catalyst gas to carrier gas for any load up to the predetermined maximum load at which the system is calibrated. When the system is activated and the gas accumulators 12 are drawing the gas mixture from the proportioning system, the operator will make no change in the controllers 33, 34, and the controllers 33, 34 will be subject to feed back from a pressure sensor switch 36. The proportion of carrier gas to catalyst gas will remain fixed at the calibrated ratio, regardless of changes in the demand for gas, because the variable valves 24, 30 will either be both open in their initially set relative settings or will be completely closed.

As hereinbefore explained, as demand for gas by the core boxes 11 drops, the pressure in line 16 increases correspondingly and three-way valves 37, 38 are simultaneously actuated to close valves 24, 30. Accordingly, whenever the valves 24, 30 are open, they will supply carrier and catalyst gas to the core boxes 11 in the proper initially set proportion.

In accordance with the present invention, there is an automatic proportioning between the two gases, regardless of demand level and no time delay is involved, as for comparison of flow rates of one gas with another. The initial calibration is made at the maximum load for which the system is designed. This insures maintenance of the proper proportion at reduced loads.

During mixing of the catalyst and carrier gases, the catalyst gas expands and is effectively superheated by virtue of this expansion in the process line. Once the two gases are mixed, the dew point or catalyst drop-out temperature is a function of total process line pressure and mixture concentration. This significantly reduces the requirement for maintaining process line temperatures even for high boiling point catalyst liquids such at TEA which has a dew point of only 110° F. in an 8% by volume concentration in a nitrogen carrier gas at 40 psi. Accordingly, the dew point temperatures are significantly less than the initial vaporization temperature for the catalyst liquid.

I claim:

1. In apparatus for mixing first and second fluids in which the first fluid is a gas and the second fluid is a liquid and in which said liquid is vaporized to convert it to a gas and is then mixed with the first fluid in its gaseous state, the improvement for proportioning the two gases and comprising valve means for controlling the flow rate of both gases through variable valve separately before the gases are mixed, means for setting the variable valve for one gas to establish a flow rate for that gas at a given load level and means for setting the variable valve for the other gas to establish a flow rate for the other gas at the desired proportion between the flow rates of said gases at said given load level whereby drawing on the mixture of gases at said given load level or at reduced load levels maintain said proportion regardless of load level, said variable valves being provided with pressure actuated controllers to establish their settings, manually actuated pressure regulators for said controllers by which the initial settings are made and pressure relief valves by which said variable valves are concurrently relieved of pressure to close said valves, and means for actuating said pressure relief valves in response to gas pressure at the load.

* * * * *